United States Patent
Kimura et al.

(10) Patent No.: US 12,454,921 B2
(45) Date of Patent: Oct. 28, 2025

(54) THROTTLE DEVICE

(71) Applicant: AISAN KOGYO KABUSHIKI KAISHA, Obu (JP)

(72) Inventors: Yuichi Kimura, Kariya (JP); Akihito Kuno, Tokai (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 18/393,862

(22) Filed: Dec. 22, 2023

(65) Prior Publication Data
US 2024/0209803 A1   Jun. 27, 2024

(30) Foreign Application Priority Data
Dec. 26, 2022   (JP) .................. 2022-208156

(51) Int. Cl.
*F02D 9/10*   (2006.01)
*F16K 1/22*   (2006.01)

(52) U.S. Cl.
CPC ......... *F02D 9/1065* (2013.01); *F02D 9/1005* (2013.01); *F16K 1/221* (2013.01); *F16K 2200/305* (2021.08)

(58) Field of Classification Search
CPC .. F16K 1/221; F16K 2200/305; F02D 9/1065; F02D 2009/0269
See application file for complete search history.

(56) References Cited

U.S. PATENT DOCUMENTS 7,302,931 B2   12/2007   Saito et al.
2004/0226538 A1*   11/2004   Cannone ............. F02M 19/12
                                                        123/399
2005/0092955 A1*   5/2005   Piciotti ............... G01D 5/2013
                                                        251/305
2006/0231072 A1*   10/2006   Saito ..................... F02D 9/107
                                                        123/399
2018/0238409 A1*   8/2018   Higuchi .................. F16F 1/06

FOREIGN PATENT DOCUMENTS

| JP | 2006291912 A | 10/2006 |
| JP | 2018119454 A | 8/2018 |
| JP | 2019044673 A | 3/2019 |
| JP | 2020033942 A | 3/2020 |

OTHER PUBLICATIONS

Japanese Office Action dated Sep. 10, 2025 for Japanese Application No. 2022-208156 (4 p.).
English Translation of Japanese Office Action dated Sep. 10, 2025 for Japanese Application No. 2022-208156 (4 p.).

* cited by examiner

*Primary Examiner* — Kelsey E Cary
(74) *Attorney, Agent, or Firm* — CONLEY ROSE, P.C.

(57) ABSTRACT

A throttle device includes a coil spring that has a first spring part, a second spring part, and an intermediate hook connecting the first spring part to the second spring part for biasing a throttle valve. The first spring part is engaged with a rotation member coupled to a throttle shaft. The second spring part is engaged with a throttle body. The intermediate hook is configured to engage with a first stopper formed on the rotation member and a second stopper formed on the throttle body. The intermediate hook includes a first part on the first spring part side and a second part on the second spring part side. When the intermediate hook is engaged with the first stopper or the second stopper, the first part abuts on the first stopper or the second stopper.

6 Claims, 12 Drawing Sheets

THROTTLE DEVICE

CROSS-REFERENCE TO RELATED APPLICATIONS

This application claims priority to Japanese patent application serial number 2022-208156, filed Dec. 26, 2022, which is incorporated herein by reference in its entirety for all purposes.

STATEMENT REGARDING FEDERALLY SPONSORED RESEARCH OR DEVELOPMENT

Not applicable.

BACKGROUND

This disclosure relates generally to throttle devices.

A vehicle having an internal combustion engine, such as automobile, is provided with a throttle device that controls the amount of air supplied to the engine. The throttle device rotates a shaft fixed to a throttle valve by an electric motor to open and close an intake passage formed in a throttle body thereof. In many cases, the throttle device includes a mechanism that moves the throttle valve to a predetermined default position even when energization to the motor is stopped, thereby ensuring a small amount of intake air. For example, in some conventional designs, the throttle device has a coil spring, in particular torsion spring, that biases the throttle valve toward such a default position.

In conventional designs, the coil spring is held between a body of the throttle device and a final gear of a gear train for transmitting rotation of the electric motor to a shaft. The coil spring includes an opener spring part, a return spring part, and an intermediate hook. The opener spring part and the return spring part are wound in opposite directions and are connected to each other via the intermediate hook having a U-shape. The intermediate hook is engaged with the gear or the body such that the return spring part or the opener spring part exhibits a biasing force toward the default position.

In some case where the coil spring biasing the throttle valve toward the default position is attached to the gear and the body, apart of the coil spring is remarkably eccentric relative to the rest of the coil spring. Thus, the gear may be provided with a member supporting an outer circumference or an inner circumference of the coil spring. In some conventional designs, an inner circumferential support part supports both the opener spring part and the return spring part from the inside, while an outer circumferential support part supports only the opener spring part from the outside. When one of the opener spring part and the return spring part is supported by the outer circumferential support part in this manner, the opener spring part and the return spring part are eccentric to each other, so that contact points to the inner circumferential support part or the outer circumferential support part are shifted from one another as viewed in an circumferential direction. As a result, the length of the opener spring part from the intermediate hook to the support point is different from that of the return spring part. Thus, there is a possibility that excessive load is applied to the intermediate hook when only one of the opener spring part and the return spring part vibrates. Accordingly, there has been a need for improved throttle devices.

SUMMARY

In one aspect of the present disclosure, a throttle device includes a throttle body defining an intake passage therein, a throttle valve configured to open and close the intake passage, a throttle shaft coupled to the throttle valve, a rotation member coupled to the throttle shaft and configured to be rotated by a driving power source, and a coil spring held between the throttle body and the rotation member and biasing the throttle valve toward a default position. The coil spring includes a first spring part that has a first end, a second spring part that has a second end, and an intermediate hook that connects the first spring part to the second spring part. The first end is held by a first spring locking part formed on the rotation member. The second end is held by a second spring locking part formed on the throttle body. The intermediate hook is configured to engage a first stopper formed on the rotation member and a second stopper formed on the throttle body. One of the rotation member and the throttle shaft includes an inner circumferential support part supporting inner circumferential surfaces of the first spring part and the second spring part. The rotation member includes an outer circumferential support part supporting an outer circumferential surface of the first spring part. The intermediate hook includes a first part on the first spring part side and a second part on the second spring part side. When the intermediate hook is engaged with the first stopper or the second stopper, the first part abuts on the first stopper or the second stopper.

DETAILED DESCRIPTION

Embodiments will be described below based upon the accompanying drawings.

Figure 1:
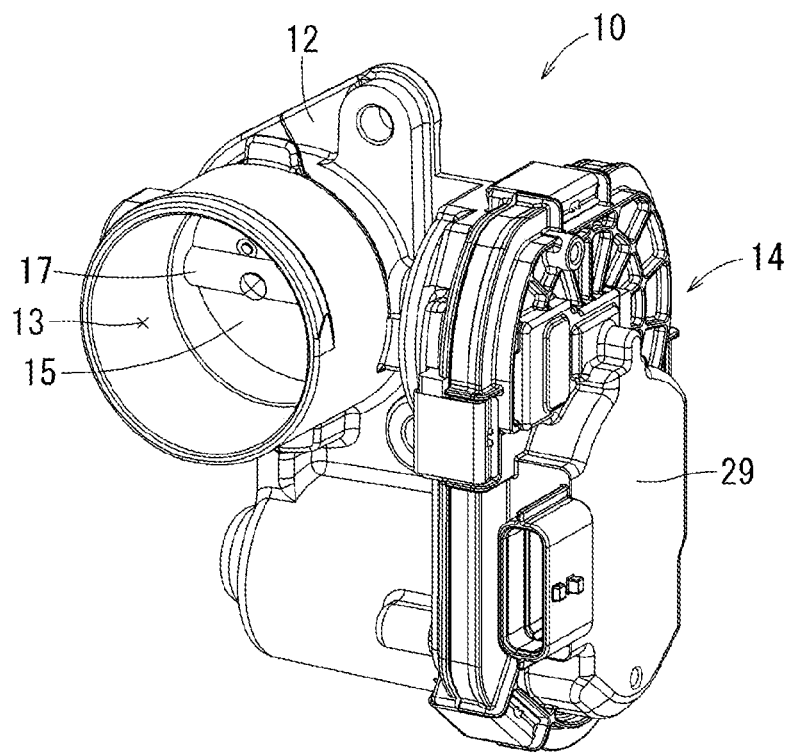
FIG. 1 is a perspective view of an embodiment of a throttle device according to the principles described herein.
Figure 2:
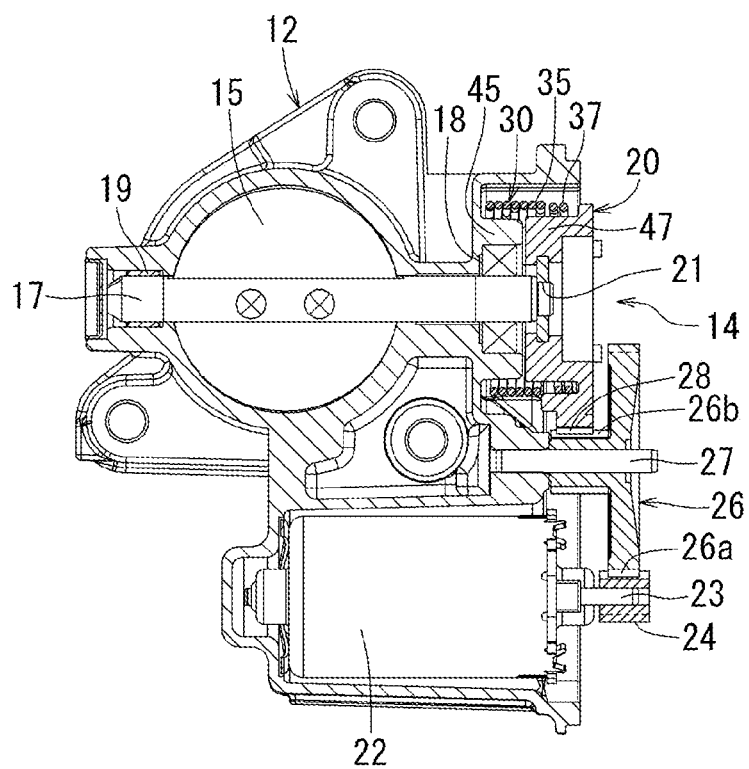
FIG. 2 is a cross-sectional view of the throttle device of FIG. 1 in a plane passing through the motor and the throttle shaft of the throttle device.
Figure 3:
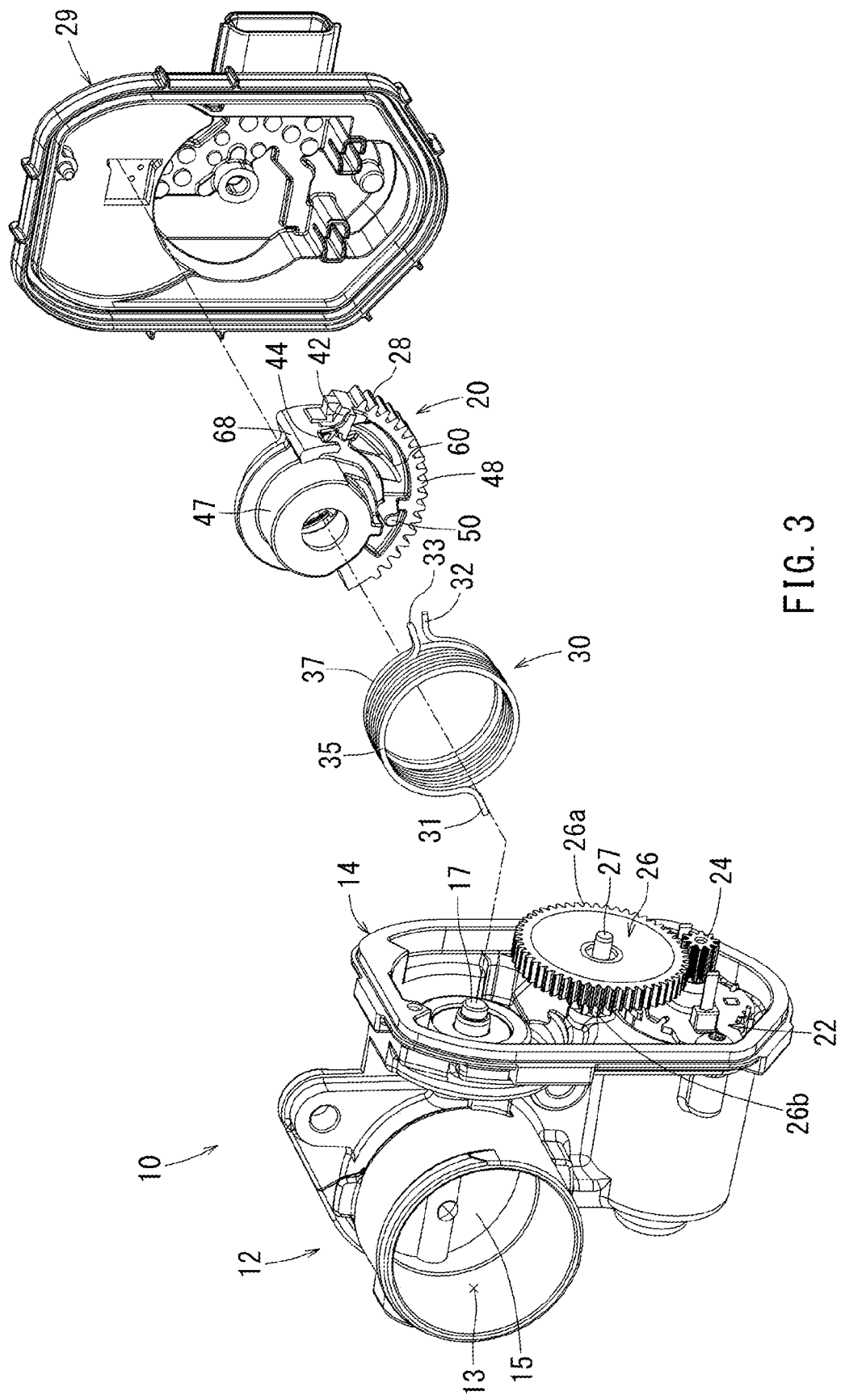
FIG. 3 is a perspective exploded view of the throttle device of FIG. 1.

FIGS. 1 to 3 show an embodiment of a throttle device 10 that is mounted on a vehicle, such as automobile, for controlling the amount of intake air supplied to an engine. The throttle device 10 includes a throttle body 12 defining an intake passage 13. The throttle body 12 may be made of metal or resin. The throttle device 10 also includes a throttle valve (disc) 15 that is in a circular plate shape. The throttle valve 15 is rotated to control the amount of air flowing through the intake passage 13. The throttle valve 15 is fixed to a throttle shaft 17 that is rotatably supported by bearings 18 and 19 attach to the throttle body 12 on opposite sides of the intake passage 13. The throttle valve 15 can rotate between a fully closed position (see FIG. 8), where the throttle valve 15 is substantially orthogonal to the intake passage 13, and a fully opened position (see FIG. 9), where the throttle valve 15 is substantially parallel to the intake passage 13. When the throttle shaft 17 rotates, the throttle valve 15 also rotates to open and close the intake passage 13. The throttle valve 15 and the throttle shaft 17 may be made of metal.

The throttle device 10 includes a motor 22 that drives the throttle valve 15. In particular, rotation of the motor 22 is transmitted to the throttle shaft 17 via a transmission mechanism. The motor 22 and the transmission mechanism are disposed in a housing part formed in the throttle body 12. The throttle body 12 has a lid 29 for closing the housing part. In one embodiment, the transmission mechanism includes a driving gear 24, an intermediate gear 26, and a throttle gear 20. The driving gear 24 is fixed to an output shaft 23 of the motor 22. The intermediate gear 26 is rotatably supported by the throttle body 12 via an intermediate shaft 27. The throttle gear 20 operates as a driven gear that is coaxially fixed to the throttle shaft 17. The intermediate gear 26 includes a large diameter teeth part 26a and a small diameter teeth part 26b that are coaxially mounted to the intermediate shaft 27. The large diameter teeth part 26a meshes with the driving gear 24. The small diameter teeth part 26b meshes with a teeth part 28 of the throttle gear 20. The throttle gear 20 may be made of resin. The throttle shaft 17 is inserted into and fixed within a mounting hole 21 in the throttle gear 20. The motor 22 is controlled by an external electronic control unit (ECU). The open degree of the throttle valve 15 is controlled by regulating the rotation direction and the rotation amount of the motor 22.

Figure 5:
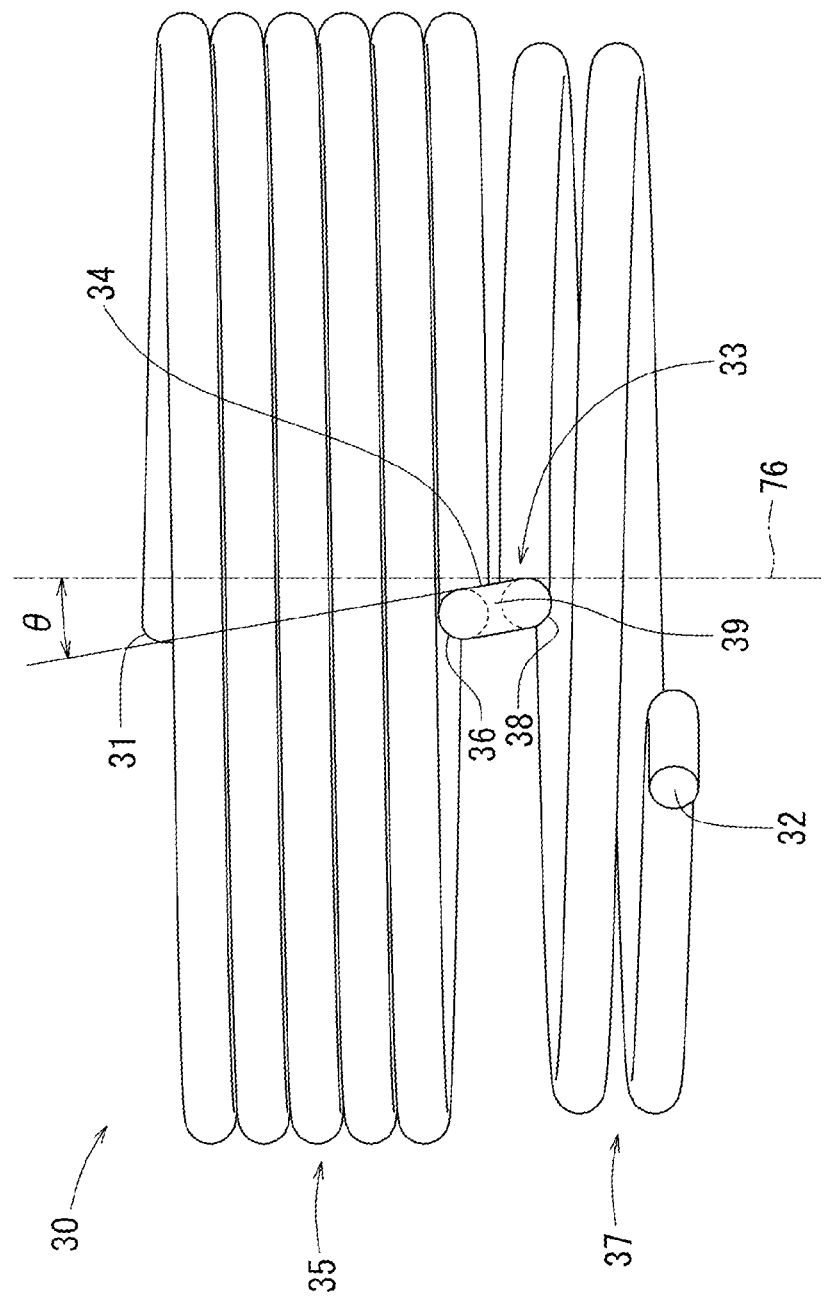
FIG. 5 is a side view of the coil spring of FIG. 3, illustrating an intermediate hook inclined relative to the central axis.
Figure 7:
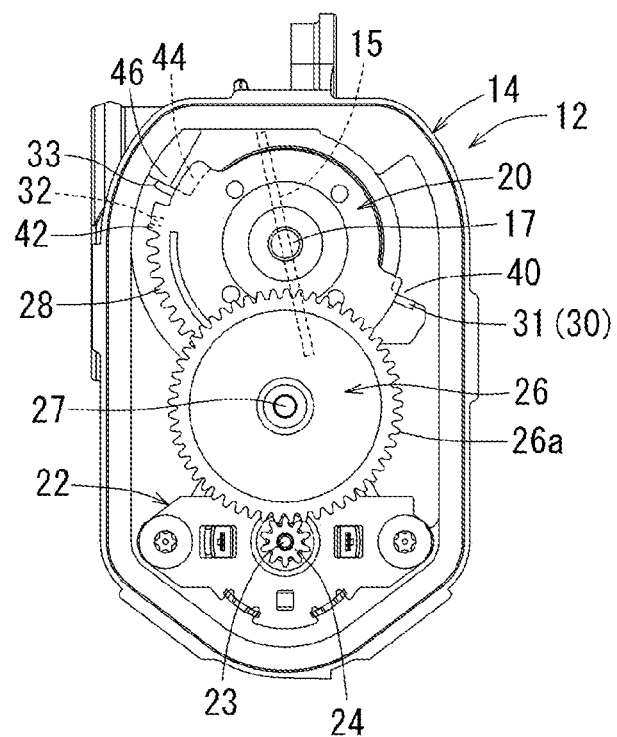
FIG. 7 is a side view of the throttle device of FIG. 1 with the lid removed from the housing part and illustrating the throttle valve in a default position.
Figure 8:
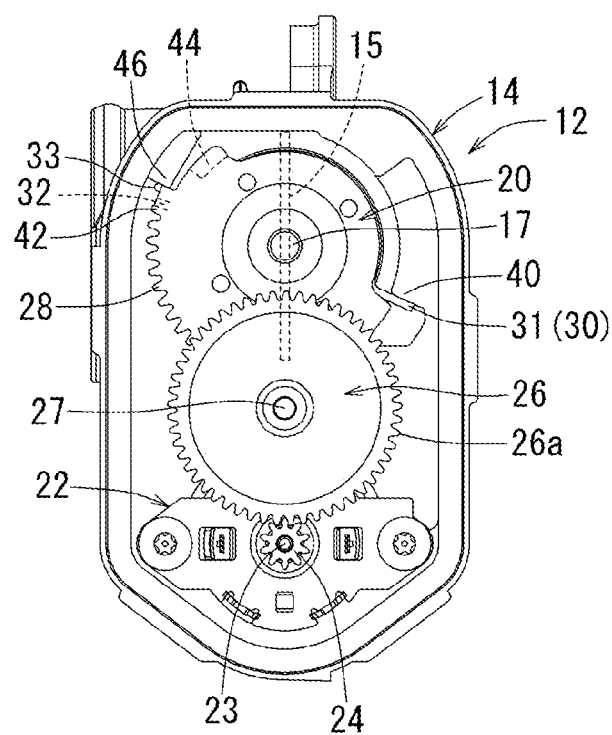
FIG. 8 is a side view of the throttle device of FIG. 1 with the lid removed from the housing part and illustrating the throttle valve in a fully closed position.

As shown in FIGS. 2, 3, and 5, the throttle device 10 includes a coil spring 30 that biases the throttle valve 15 toward a predetermined default position (see FIG. 7), where the throttle valve 15 is slightly opened from the fully closed position (see FIG. 8). The coil spring 30 acts as a torsion spring. While the motor 22 is energized such that the output shaft 23 can be controlled, it is possible to rotate the throttle valve 15 to any position between the fully closed position (FIG. 8) and the fully opened position (FIG. 9) against the biasing force of the coil spring 30. When the energization to the motor 22 stops, the throttle valve 15 automatically returns to the default position due to the biasing force of the coil spring 30, thereby supplying the small amount of air to the engine through the intake passage 13.

The coil spring 30 includes a return spring part 35 and an opener spring part 37 that are wound in opposite directions and connected to each other. In this embodiment, the return spring part 35 is wound about six turns, while the opener spring part 37 is wound about two turns. The coil spring 30 is held between the throttle body 12 and the throttle gear 20. Both ends 31 and 32 of the coil spring 30 are bent to project radially outward. The end 31 is engaged with a body side spring locking part 40 (see FIG. 7), which is formed on the throttle body 12. The end 32 is engaged with a gear side spring locking part 42, which is formed on the throttle gear 20. The end 31 that is engaged with the throttle body 12 corresponds to an end of the return spring part 35, whereas the end 32 that is engaged with the throttle gear 20 corresponds to an end of the opener spring part 37.

As shown in FIGS. 3, 5, 6, and 16, a connection part between the return spring part 35 and the opener spring part 37 is folded in a U-shaped manner and bent to project radially outward. The connection part functions as an intermediate hook 33 that is configured to engage at least one of a gear side stopper 44, which is formed on the throttle gear 20, and a body side stopper 46, which is formed on the throttle body 12. When the throttle gear 20 remains in the default position as illustrated in FIG. 7, the intermediate hook 33 is engaged with the gear side stopper 44 of the throttle gear 20 and the body side stopper 46 of the throttle body 12. In this state, the return spring part 35 and the opener spring part 37 are twisted such that their diameters are reduced as compared to a natural or relaxed state, and thus are in a state that a preload is applied, in other words, elastic energy is stored.

When the throttle gear 20 rotates from the default position (see FIG. 7) toward the fully closed position (see FIG. 8) due to driving the motor 22, the intermediate hook 33 of the coil spring 30 is engaged with the body side stopper 46 of the throttle body 12. Thus, both ends of the return spring part 35 are trapped by the throttle body 12 so that the return spring part 35 is generally static. On the other hand, the throttle gear 20 rotates relatively to the throttle body 12 in a state that the intermediate hook 33 is engaged with the body side stopper 46, so that the gear side stopper 44 of the throttle gear 20 is separated from the intermediate hook 33. The throttle gear 20 rotates while engaging with the end 32 of the coil spring 30, so that the opener spring part 37 is further twisted in a direction to reduce the diameter thereof. When the energization to the motor 22 stops in a state where the throttle gear 20 shifts from the default position toward the fully closed position, the throttle gear 20 returns to the default position due to the biasing force of the opener spring part 37.

Figure 9:
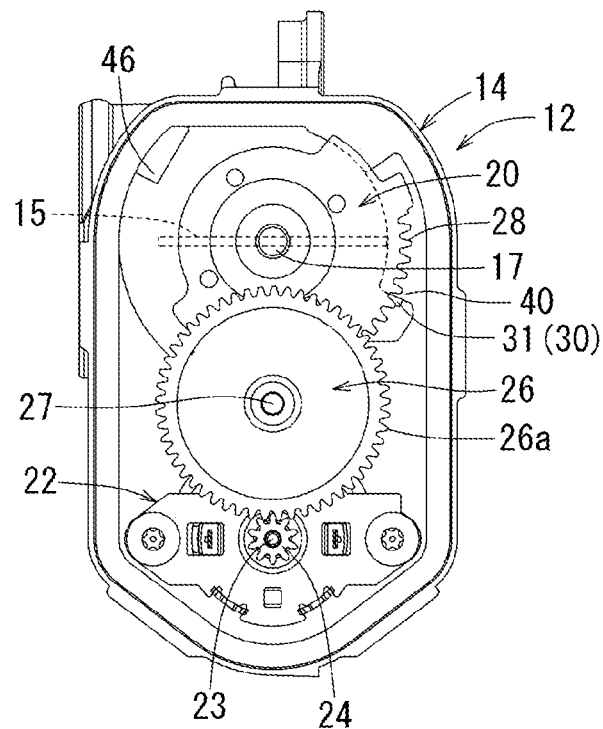
FIG. 9 is a side view of the throttle device of FIG. 1 with the lid removed from the housing part and illustrating the throttle valve in a fully opened position.

When the throttle gear 20 rotates from the default position (see FIG. 7) toward the fully opened position as shown in FIG. 9 due to driving the motor 22, the intermediate hook 33 remains to be engaged with the gear side stopper 44 of the throttle gear 20. Thus, both ends of the opener spring part 37 are trapped by the throttle gear 20, so that the opener spring part 37 is generally static. On the other hand, the throttle gear 20 rotates relatively to the throttle body 12 in a state where the intermediate hook 33 is engaged with the gear side stopper 44, so that the return spring part 35 is further twisted to reduce the diameter thereof. When the energization to the motor 22 stops in a state where the throttle gear 20 shifts from the default position toward the fully opened position, the throttle gear 20 returns to the default position due to the biasing force of the return spring part 35.

When the throttle gear 20 rotates between the default position and the fully closed position, the opener spring part 37 is twisted. However, the rotation amount of each portion of a wire of the opener spring part 37 is not uniform or constant in this state. For example, a portion of the opener spring part 37 near the end 32 that is held by the throttle gear 20 rotates to follow the throttle gear 20, so that the rotation amount thereof relative to the throttle gear 20 is relatively small. On the other hand, in a case of a portion of the opener spring part 37 near the intermediate hook 33 is trapped by the body side stopper 46, the rotation amount relative to the throttle body 12 is small, so that the rotation amount relative to the throttle gear 20 is relatively large.

Figure 4:
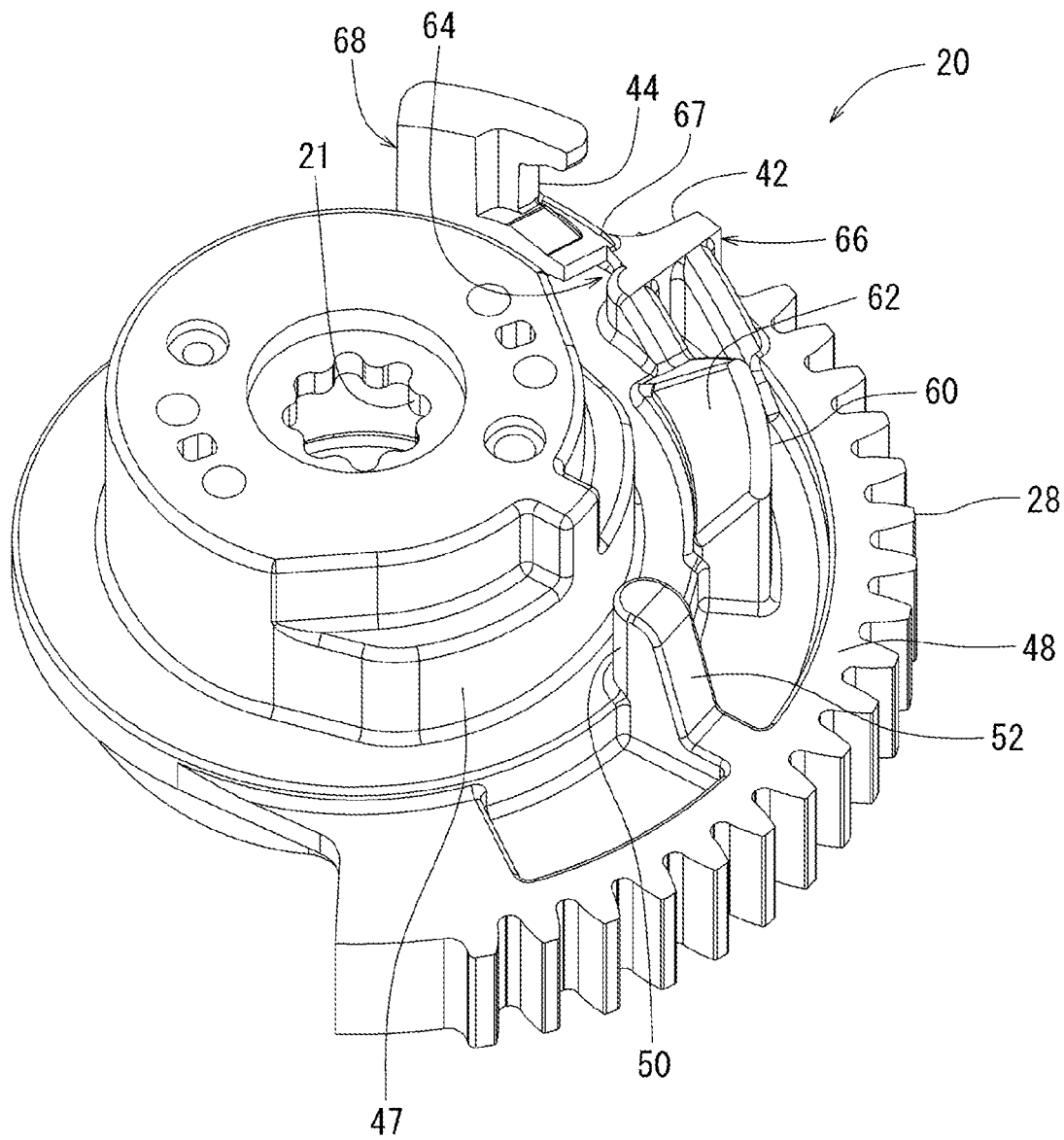
FIG. 4 is a perspective view of the throttle gear of the throttle device of FIG. 3.
Figure 6:
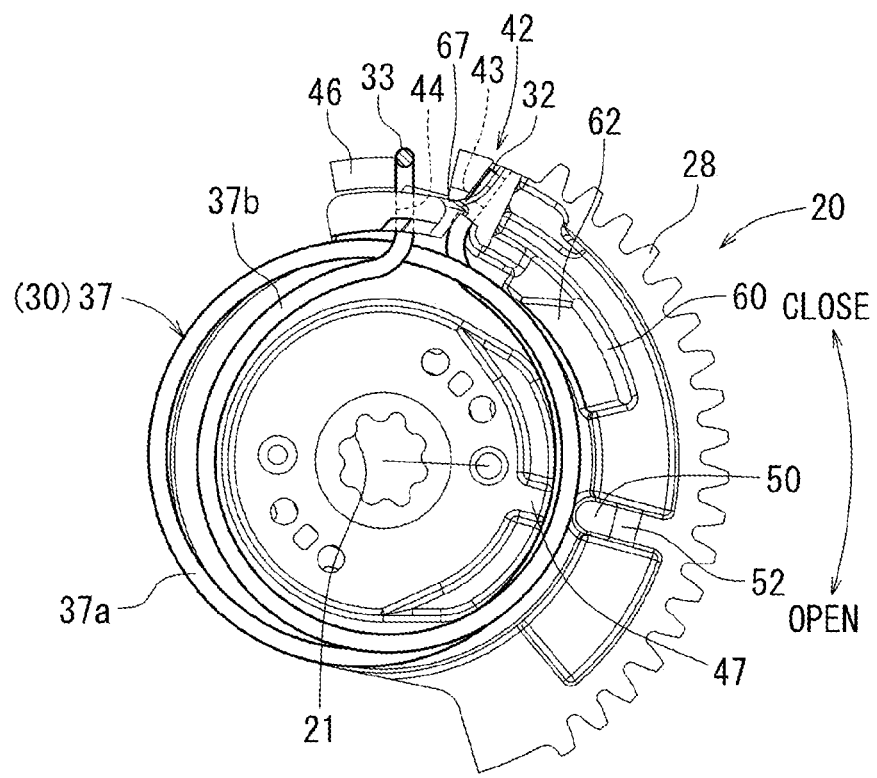
FIG. 6 is a rear view of the throttle gear of FIG. 3 provided with an opener spring part of the coil spring, in which the coil spring is cut at the intermediate hook.

As shown in FIGS. 4 and 6, the throttle gear 20 includes an inner circumferential support part 47 protruding into an internal space of the coil spring 30 to suppress decentering of the coil spring 30. In one example, the inner circumferential support part 47 has a cylindrical shape protruding from a base plate of the throttle gear 20 including the teeth part 28. The mounting hole 21 to which the throttle shaft 17 is fixed can be formed on a metal plate that is bonded to the inner periphery of the inner circumferential support part 47 by insert molding. The inner circumferential support part 47 has projects to a height from the opener spring part 37. The inner circumferential support part 47 may extend to the inside of the returns spring part 35 (e.g., to a position corresponding to two turns of the return spring part 35 from the intermediate hook part 33).

Figure 10:
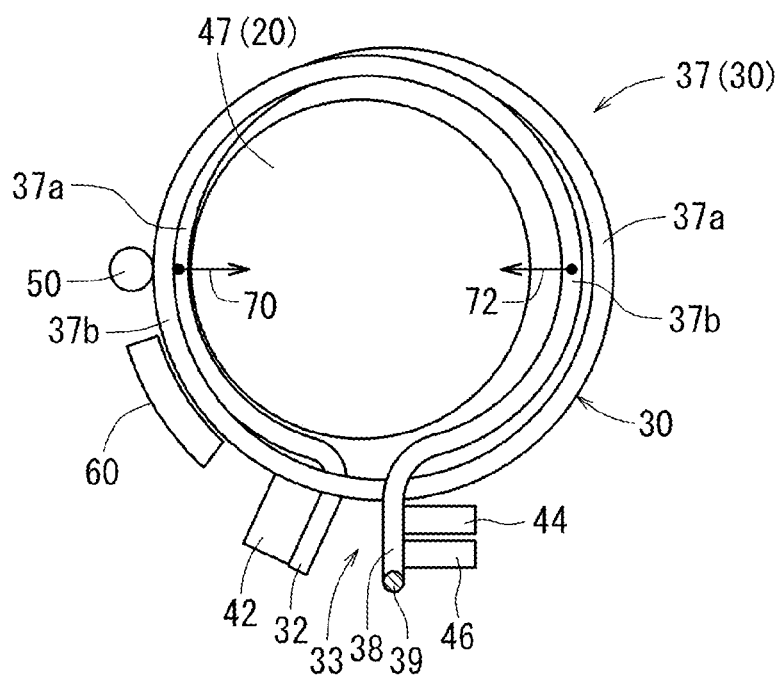
FIG. 10 is an axial view of the opener spring part of the coil spring of the throttle device of FIG. 1 in a decentering state and an outer circumferential support part supporting the opener spring part.
Figure 11:
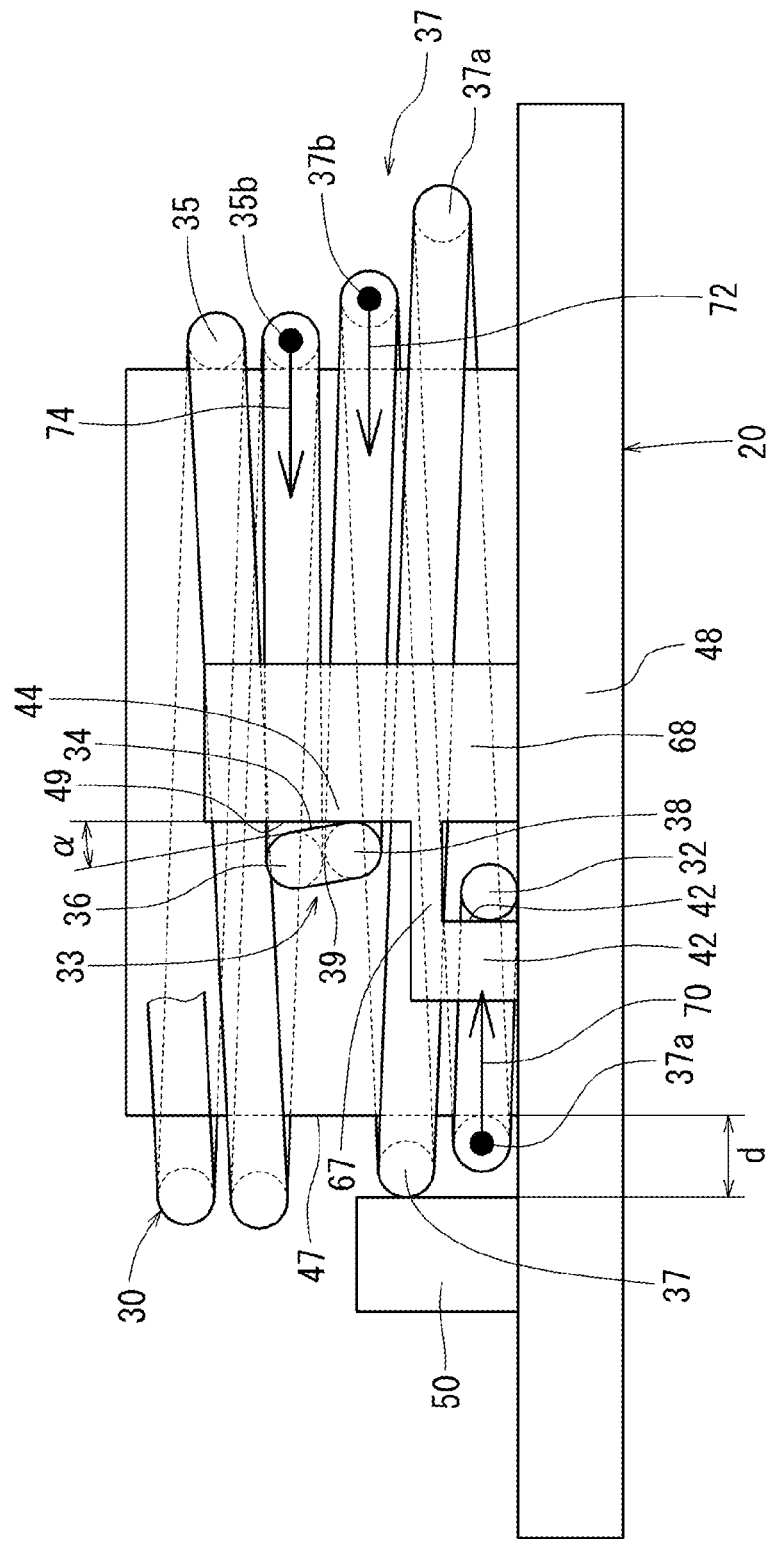
FIG. 11 is a side view of the coil spring of the throttle device of FIG. 1 in a state the opener spring part is pressed by the outer circumferential support part such that the opener spring part is eccentric to the return spring part.

As shown in FIGS. 10 and 11, the opener spring part 37 is attached in a state that it is twisted in a direction to reduce its diameter such that the preload is applied to the opener spring part 37. Accordingly, a one turn part 37a of the opener spring part 37 near the end 32 tends to shift in a direction (shown by an arrow 70) substantially the same as a direction of reaction force received from the gear side locking part 42 such that the one turn part 37a is eccentric to the central axis of the throttle gear 20. The inner circumferential support part 47 supports the inner circumferential surface of the one turn part 37a that tends to decenter. Furthermore, the return spring part 35 is also attached in a state where it is twisted in a direction to decrease its diameter such that the preload is applied to the return spring part 35. Accordingly, a one turn part 35b of the return spring part 35 proximate to the intermediate hook 33 tends to shift in a direction (shown by an arrow 74) substantially the same as a direction of reaction force received from the gear side stopper 44 (or the body side stopper 46) such that the one turn part 35b is eccentric to the central axis of the throttle gear 20. The inner circumferential support part 47 supports the inner circumferential surface of the one turn part 35b that tends to decenter. The inner circumferential support part 47 suppresses the decentering of the coil spring 30, which may otherwise occur when the coil spring 30 is twisted due to rotation of the throttle gear 20 during the operation of the throttle device 10.

In another embodiment (not shown), the inner circumferential part may be formed on the throttle shaft 17 instead of the throttle gear 20.

As shown in FIG. 2, the throttle body 12 includes a bearing holding part 45 for holding the bearing 18 close to the throttle gear 20. The bearing holding part 45 can be sized and shaped to extend into the internal space of the return spring part 35 to act as an additional inner circumferential support part for the return spring part 35. However, the term "inner circumferential support part" in the following description normally refers to the inner circumferential support part 47 formed on the throttle gear 20.

As shown in FIGS. 4 and 6, the throttle gear 20 includes at least one outer circumferential support part 50 that abuts a radially outer circumferential surface of the opener spring part 37 of the coil spring 30. The outer circumferential support part 50 can be integrally formed on the throttle gear 20. In one embodiment, the outer circumferential support part 50 is shaped to extend from a base part 48 of the throttle gear 20 in which the teeth part 28 is formed on the same side as the inner circumferential support part 47. For example, the outer circumferential support part 50 may be shaped to be brought into point contact with the opener spring part 37. In particular, the outer circumferential support part 50 may have a cylindrical shape oriented parallel to the central axis of the throttle gear 20.

Figure 12:
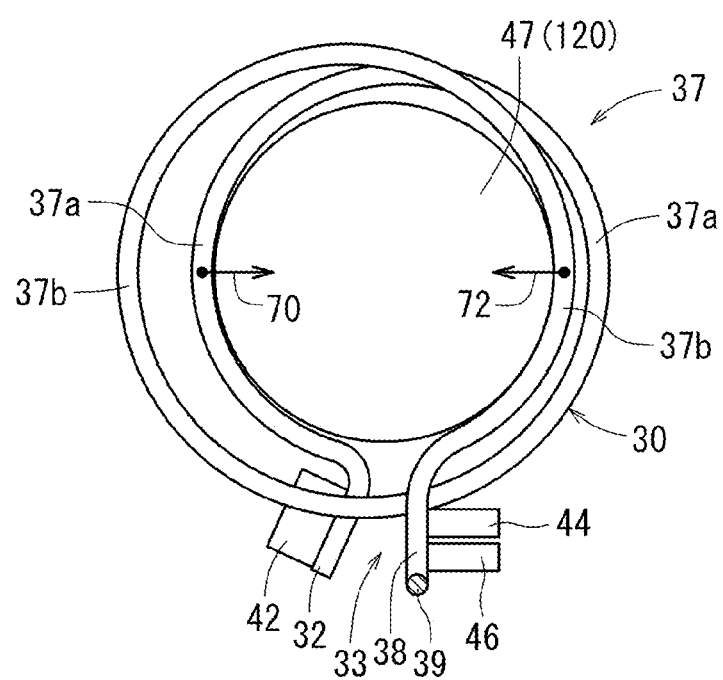
FIG. 12 is an axial view of the opener spring part of the coil spring of the throttle device of FIG. 1 in a decentering state without the outer circumferential support part.
Figure 13:
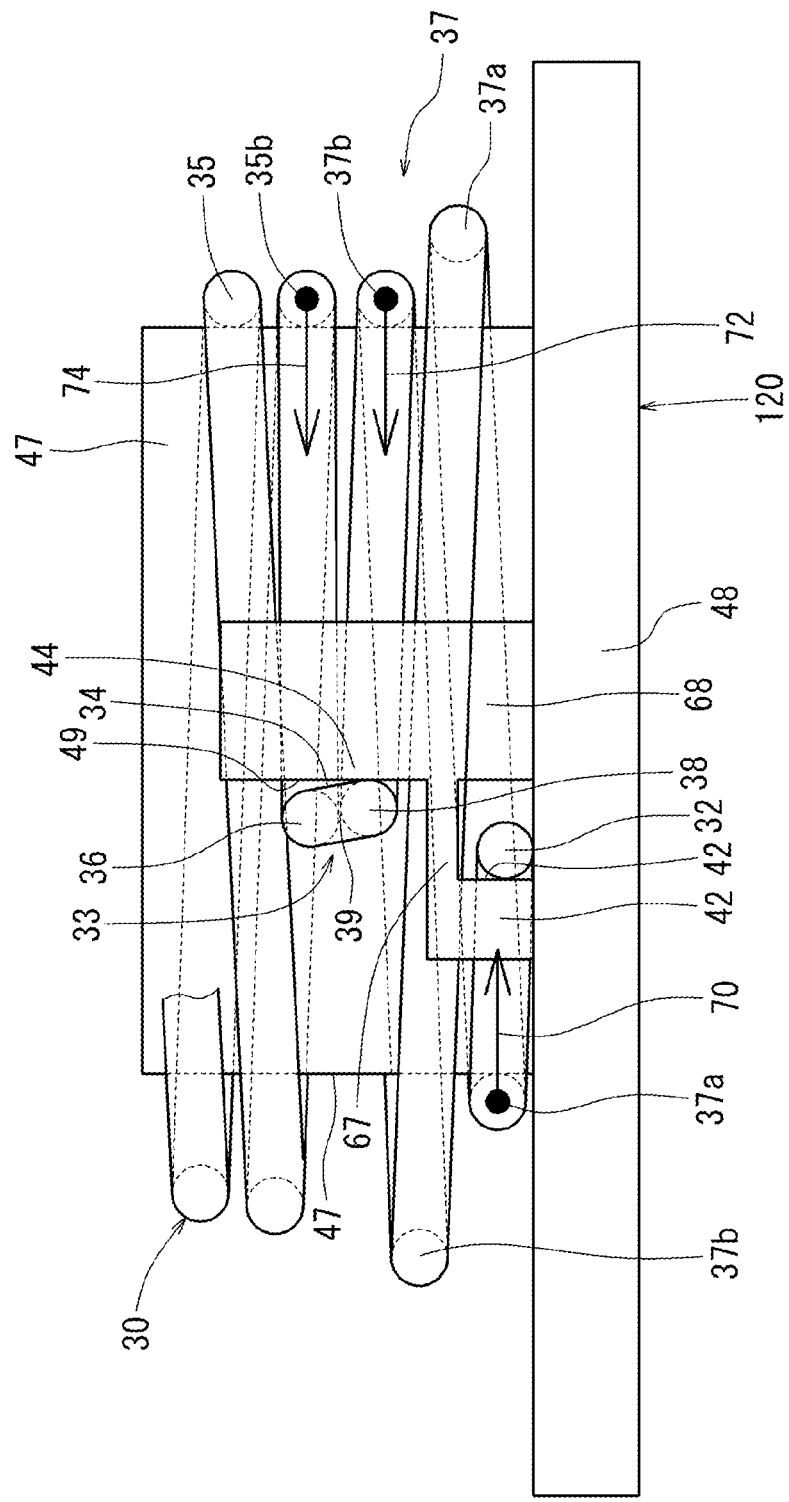
FIG. 13 is a side view of the opener spring part of the coil spring of the throttle device of FIG. 1 in the decentering state without the outer circumferential support part.

As shown in FIGS. 12 and 13, in a case where the throttle gear 120 does not have the outer circumferential support part 50, the one turn part 37b of the opener spring part 37 near the intermediate hook 33 shifts in the direction (shown by an arrow 72) substantially the same as the direction of the reaction force received from the body side stopper (or the gear side stopper 44) due to the preload applied to the opener spring part 37 being greatly eccentric to the central axis of the throttle gear 20. In particular, because the wound number of the opener spring part 37 is relatively small (about two), it is difficult to distribute the reaction force received from the body side stopper 46 and the gear side spring locking part 42 to each turn part. Accordingly, the decentering amount of each turn part of the opener spring part 37 tends to become relatively large. Thus, a portion of the opener spring part 37 near the intermediate hook 33 (the right portion in FIGS. 12 and 13) is pressed against the inner circumferential support part 47 so that the opposite part (the left portion in FIGS. 12 and 13) is greatly spaced away from the inner circumferential support part 47. When the throttle gear 20 rotates from the default position toward the fully closed position, the opener spring part 37 further twists in a direction that reduces its diameter, thereby increasing the pressing force of the opener spring part 37 against the inner circumferential support part 47. When the throttle gear 20 rotates between the default position and the fully closed position, the intermediate hook 33 is trapped by the body side stopper 46 so that the rotation amount of the portion of the opener spring part 37 near the intermediate hook 33 relative to the throttle gear 20 is relatively large as described above. Accordingly, even when this portion of the opener spring part 37 is pressed against the inner circumferential support part 47, friction between the opener spring part 37 and the inner circumferential support part 47 is generated during rotation of the throttle gear 20, thereby increasing the rotational resistance applied to the throttle gear 20.

On the contrary, in the embodiment shown in FIGS. 10 and 11, the throttle gear 20 includes the outer circumferential support part 50 that abuts on an outer circumferential surface of the one turn part 37b of the opener spring part 37 near the intermediate hook 33 to suppress the decentering of the one turn part 37b. The one turn part 37b near the intermediate hook 33 is separated from the inner circumferential support part 47 of the throttle gear 20. That is, the inner circumferential surface of the one turn part 37b of the opener spring part 37 near the intermediate hook 33 is spaced away from the inner circumferential support part 47. Accordingly, the friction between the opener spring part 37 and the inner circumferential support part 47 can be eliminated while the throttle gear 20 rotates between the default position and the fully closed position. As a result, it is possible to reduce abrasion of the inner circumferential support part 47. Further, the load on the motor 22 can be reduced so that it is possible to downsize the motor 22 and/or improve a speed reducing ratio of the transmission mechanism, thereby downsizing the throttle device 10.

In another embodiment (not shown), the outer circumferential support part 50 can be configured such that the force of the opener spring part 37 pressed against the inner circumferential support part 47 is decreased, instead of a configuration where the one turn part 37b of the opener spring part 37 near the intermediate hook 33 is completely spaced away from the inner circumferential support part 47. In other words, it can be configured such that the opener spring part 37 is pressed in a direction opposite to the direction (shown by the arrow 72 in FIG. 10) in which the opener spring part 37 tends to be decentering. With such a configuration, it is possible to reduce friction generated between the opener spring part 37 and the inner circumferential support part 47 while the throttle gear 20 rotates.

As shown in FIG. 6, the outer circumferential support part 50 can be positioned to abut the one turn part 37b of the opener spring part 37 at an angular position within a range of about 180° to about 360° (e.g., about 270°) from the intermediate hook 33. With such arrangement, it is possible to avoid contact at a position where the relative rotation between the opener spring part 37 and the inner circumferential support part 47 is relatively large, thereby effectively reducing the friction therebetween.

The radial distance between the central axis of the throttle gear 20 and the outer circumferential surface of the inner circumferential support part 47 may not be constant. For example, the radial distance may be greater at a position where the outer circumferential surface of the inner circumferential support part 47 supports the one turn part 37a of the opener spring part 37 near the end 32. On the other hand, the radial distance may be less at a position where the one turn part 37b of the opener spring part 37 near the intermediate hook 33 approaches the outer circumferential surface of the inner circumferential support part 47 due to the decentering.

As shown in FIG. 11, the minimum radial distanced between the inner circumferential support part 47 and the outer circumferential support part 50 where the opener spring part 37 is disposed may be two times or less of the wire diameter of the opener spring part 37. Because of this configuration, it is possible to prevent overlapping of the wires of the opener spring part 37 with each other between the inner circumferential support part 47 and the outer circumferential support part 50, thereby stabilizing the position of the opener spring part 37.

As shown in FIG. 11, the direction of a stopper facing surface 34 of the intermediate hook 33 of the coil spring 30 is set such that an opener spring side leg 38 of the intermediate hook 33 (a portion on the opener spring part 37 side of a folded part 39) abuts on the gear side stopper 44. The stopper facing surface 34 of the intermediate hook 33 is a flat surface defined by the opener spring side leg 38 and a return spring side leg 36 of the intermediate hook 33 on the side to face the gear side stopper 44. As shown in FIG. 5, when viewing the coil spring 30 alone, the above-described direction of the stopper facing surface 34 can be achieved by inclining the stopper facing surface 34 of the intermediate hook 33 relative to a central axis 76 of the coil spring 30 (by the angle θ). As a result, the return spring side leg 36 may not abut on the gear side stopper 44. However, in another embodiment not shown, the return spring side leg 36 may abut on the gear side stopper 44. For example, the stopper facing surface 34 of the intermediate hook 33 may be oriented such that the angle α of the stopper facing surface 34 relative to a contact surface 49 of the gear side stopper 44 is between 0 to 7 degrees.

As described above, the opener spring part 37 is supported by the outer circumferential support part 50 from the outer circumferential side, and the one turn part 37b of the opener spring part 37 near the intermediate hook 33 is spaced away from the inner circumferential support part 47. On the other hand, the return spring part 35 is not supported by the outer circumferential support part 50, so that the one turn part 35b of the return spring part 35 near the intermediate hook 33 is supported by the inner circumferential support part 47. As a result, the opener spring part 37 is supported by the outer circumferential support part 50 at a position corresponding to about three-quarters of the circumference of the opener spring part 37 from the intermediate hook 33, whereas, the return spring part 35 is supported by the inner circumferential support part 47 at a position corresponding to about a quarter of the circumference of the return spring part 35 from the intermediate hook 33, and thus, their first support points are shifted from each other. Due to this difference of the distances between the intermediate hook 33 and the first support points, only one of the opener spring part 37 and the return spring part 35 tends to vibrate in the axial direction of the coil spring 30. However, since the opener spring side leg 38 of the intermediate hook 33 abuts on the gear side stopper 44, even when the opener spring part 37 vibrates, transmission of such vibration to the folded part 39 of the intermediate hook 33 can be prevented. Thus, it is possible to suppress repeat application of bending stress or torsion stress to the folded part 39, thereby increasing the durability of the throttle device 10 against the vibration.

Figure 14:
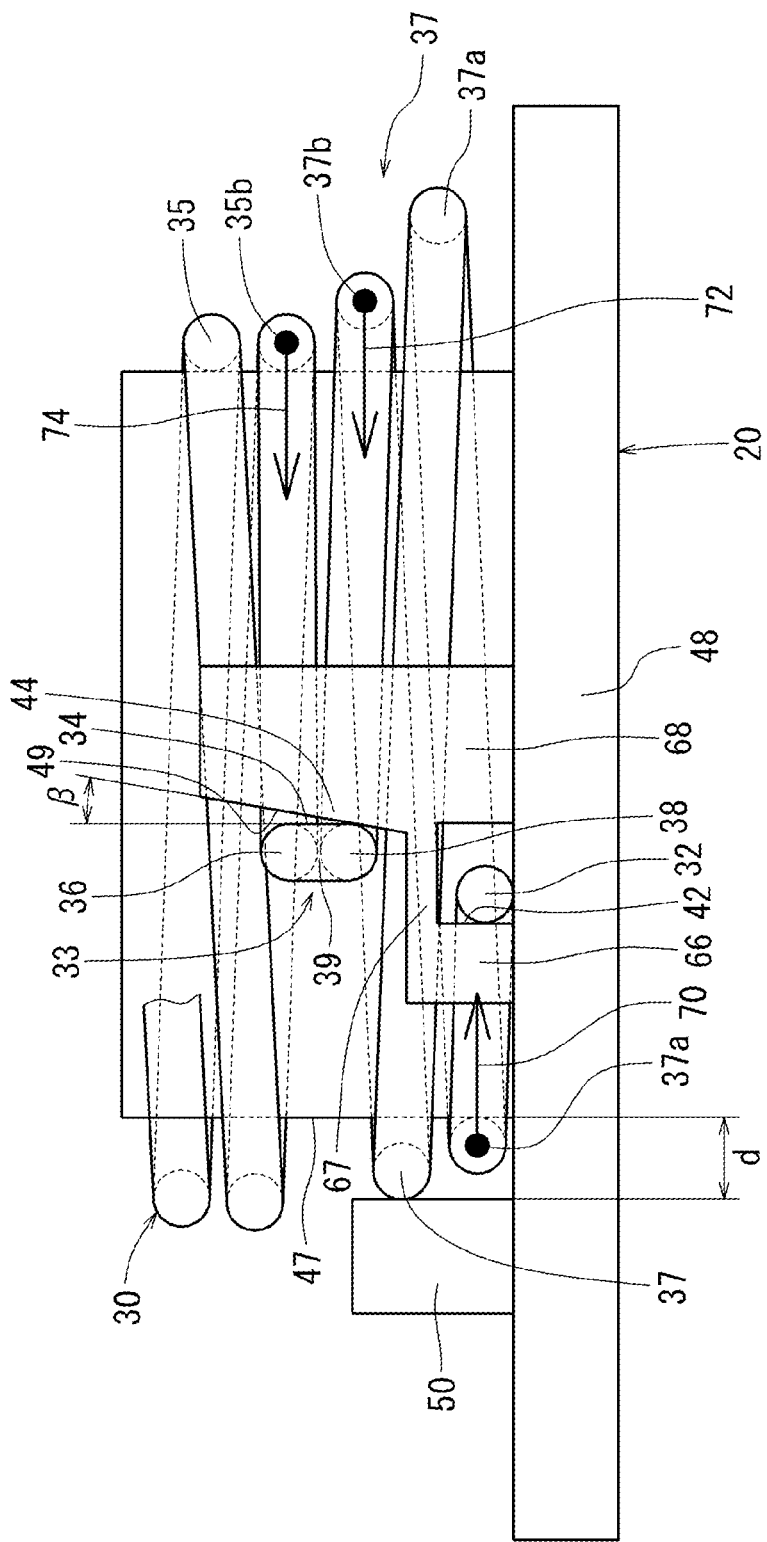
FIG. 14 is a side view of another embodiment of the throttle gear having a gear side stopper inclined relative to the central axis of the throttle gear.

As shown in FIG. 14, in another embodiment, the opener spring side leg 38 of the intermediate hook 33 may be formed to abut on the gear side stopper 44 by inclining the contact surface 49 of the gear side stopper 44 relative to the central axis of the throttle gear 20 or the stopper facing surface 34 of the intermediate hook 33 (by the angle θ), instead of inclining the stopper facing surface 34 of the intermediate hook 33. In another embodiment (not shown), a contact surface of the body side stopper 46 on which the intermediate hook 33 abuts may be tilted in the same manner in addition to inclining the gear side stopper 44. In another embodiment, the stopper facing surface 34 of the intermediate hook 33, the contact surface 49 of the gear side stopper 44, and the contact surface of the body side stopper 46 may be inclined. In accordance with these embodiments, even when the opener spring part 37 vibrates, vibration transmission to the folded part 39 of the intermediate hook 33 can be suppressed for the same reason described above.

Figure 15:
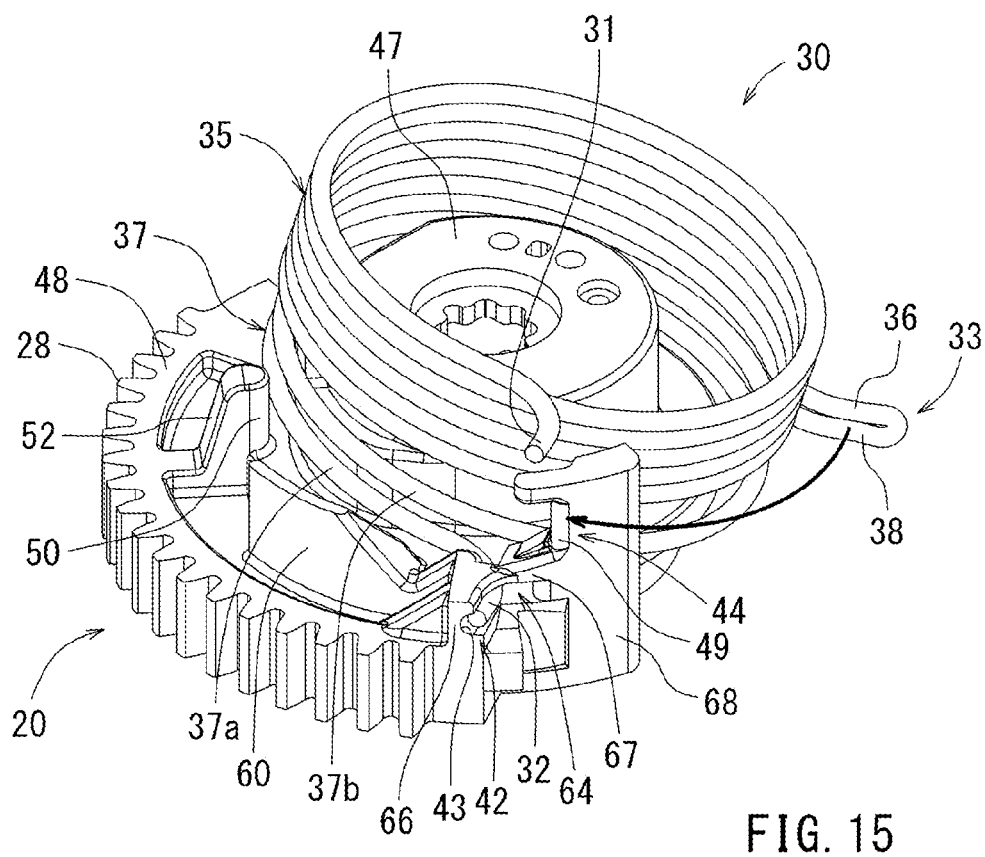
FIG. 15 is a perspective view of the throttle gear of FIG. 14 illustrating a step for attaching the coil spring to the throttle gear, in which the coil spring tends to get into the inside of the outer circumferential support part.
Figure 16:
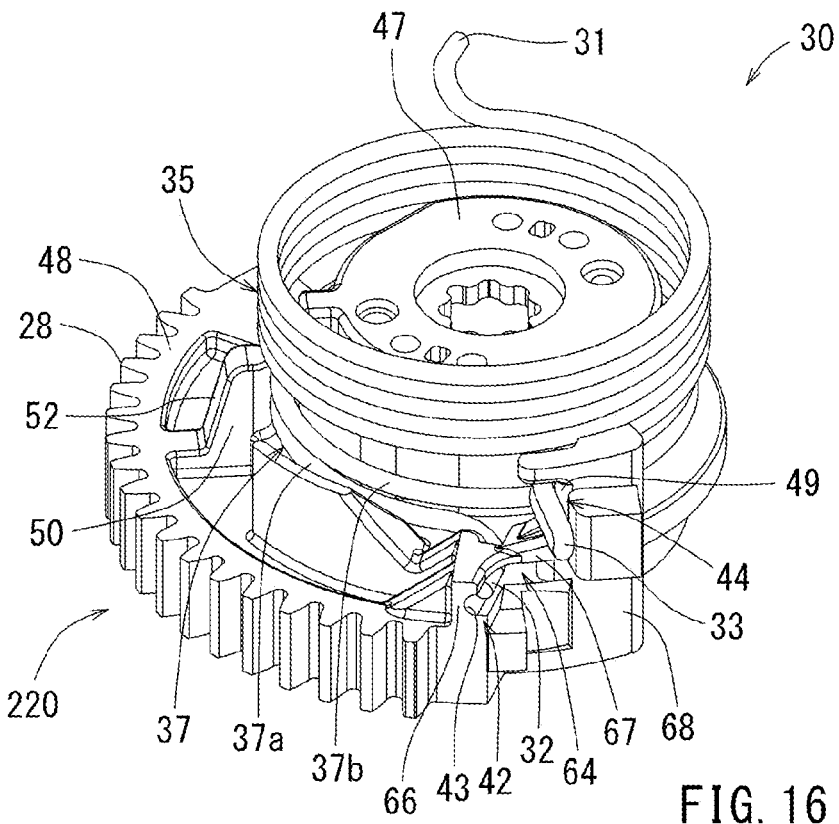
FIG. 16 is a perspective view of the coil spring attached to the throttle gear of FIG. 14.

As shown in FIGS. 15 and 16, an engagement groove 43 configured to mate with and receive the end 32 is formed at the gear side spring locking part 42 where the gear side end 32 of the coil spring 30 is engaged. Further, the gear side spring locking part 42 includes an inward facing wall of a holding hole 64 surrounding the gear side end 32 of the coil spring 30. Due to such configuration, it is possible to prevent the gear side end 32 of the coil spring 30 from completely disassembling from the gear side spring locking part 42 by vibration or the like during use or assembling process. For example, the holding hole 64 is formed by providing a joint part 67 between a support column 66 including the gear side spring locking part 42 and a support column 68 including the gear side stopper 44. The joint part 67 can especially prevent detachment of the gear side end 32 of the coil spring 30 from the gear side spring locking part 42. In another embodiment (not shown), a projection extending from the support column 66 including the gear side spring locking part 42 toward the support column 68 including the gear side stopper 44 may be provided, instead of the joint part 67. The projection that does not reach the support column 68 of the gear side stopper 44 can form a holding hole partially surrounding the gear side end 32 of the coil spring 30.

As shown in FIG. 15, to attach the coil spring 30 to the throttle gear 20, the end 32 is engaged with the gear side spring locking part 42, and then the intermediate hook 33 is engaged with the gear side stopper 44 while twisting the opener spring part 37 in the diameter reducing direction. At such time, it is necessary to take care to position the opener spring part 37 into a space between the inner circumferential support part 47 and the outer circumferential support part 50. FIG. 16 illustrates the coil spring 30 properly attached to the throttle gear 20.

As shown in FIGS. 4, 15, and 16, the throttle gear 20 is provided with an obstacle structure 60 to prevent the coil spring 30 from being attached to an incorrect position. The obstacle structure 60 has a block shape extending from the base part 48 of the throttle gear 20 on the same side as the outer circumferential support part 50. The obstacle structure 60 is preferably disposed between the outer circumferential support part 50 of the throttle gear 20 and the gear side spring locking part 42. In one example, the obstacle structure 60 may be an arc-shaped block extending circumferentially through an angle of about 45 degrees viewed along the central axis of the throttle gear 20. The obstacle structure 60 may be provided with an inner side slope 62 that is inclined from a top portion toward the base part 48 of the throttle gear 20 on the inside (on the inner circumferential support part 47 side).

In another embodiment (not shown), the coil spring 30 may be replaced with a coil spring that has a structure symmetric to the coil spring 30 illustrated in the drawings depending on the rotation direction of the throttle valve 15 for opening and closing the throttle valve 15 and/or the direction where the throttle shaft 17 extends from the throttle valve 15. Of course, in a case where such coil spring symmetric to the coil spring 30 is used, the return spring part and the opener spring part are wound in opposite directions.

In another embodiment, the wound number of the return spring 35 and the wound number of the opener spring part 37 of the coil spring 30 can be changed from those described above. In another embodiment, the diameter of each turn of the return spring part 35 and the opener spring part 37 can be changed from those described above.

In another embodiment, the coil spring 30 may include a first spring part that is engaged with the throttle gear 20 as the return spring part, and a second spring part that is engaged with the throttle body 12 as the opener spring part. In this case, the rotation directions of the throttle gear 20 for opening and closing the throttle valve 15 are opposite to the directions shown in FIG. 6. In such embodiment, the outer circumferential support part can be provided to suppress the decentering of the return spring part (not the opener spring part). Furthermore, the return spring side leg of the intermediate hook may abut on the gear side stopper to prevent vibration transmission to the folded part of the intermediate hook even when the return spring part vibrates.

The present disclosure is not limited to the above-described embodiments and can be modified or changed without departing from the scope or spirit of the subject matter of this disclosure.

What is claimed is:

1. A throttle device, comprising:
a throttle body including an intake passage therein;
a throttle valve configured to open and close the intake passage;
a throttle shaft coupled to the throttle valve, wherein the throttle shaft has a central axis of rotation;
a rotation member coupled to the throttle shaft and configured to be rotated by a driving power source; and
a coil spring positioned between the throttle body and the rotation member, wherein the coil spring biases the throttle valve toward a default position, wherein:
the coil spring includes a first spring part having a first end, a second spring part having a second end, and an intermediate hook connecting the first spring part to the second spring part;
the first end of the first spring part is held by a first spring locking part on the rotation member;
the second end of the second spring part is held by a second spring locking part on the throttle body;
the intermediate hook is configured to engage with a first stopper on the rotation member and a second stopper on the throttle body;
one of the rotation member and the throttle shaft includes an inner circumferential support part protruding into an internal space of the coil spring, where the inner circumferential support part has a radially outer surface relative to the central axis of rotation, wherein the radially outer surface of the inner circumferential support part is configured to engage and support a radially inner circumferential surface of the first spring part and a radially inner circumferential surface of the second spring part, wherein the radially outer surface of the inner circumferential support part includes a first circumferential portion disposed at a first radial distance from the central axis of rotation and a second circumferential portion at a second radical distance from the central axis of rotation, wherein the first radial distance is greater than the second radial distance;
the rotation member includes an outer circumferential support part configured to engage and support a radially outer circumferential surface of the first spring part;
the intermediate hook includes a first part on the first spring part side and a second part on the second spring part side; and
when the intermediate hook is engaged with the first stopper or the second stopper, the first part of the intermediate hook abuts the first stopper or the second stopper.

2. The throttle device of claim 1, wherein:
the intermediate hook includes a stopper facing surface facing the first stopper; and
the stopper facing surface is inclined relative to a central axis of the coil spring.

3. The throttle device of claim 1, wherein the rotation member further includes a holding hole that surrounds the first end of the first spring part engaged with the first spring locking part, wherein the holding hole includes an engagement groove configured to mate with and receive one end of the coil spring.

4. The throttle device of claim 3, wherein the first spring locking part defines an inner periphery of the holding hole.

5. A throttle device, comprising:
a throttle body including an intake passage therein;
a throttle valve configured to open and close the intake passage;
a throttle shaft coupled to the throttle valve;
a rotation member coupled to the throttle shaft and configured to be rotated by a driving power source; and
a coil spring positioned between the throttle body and the rotation member, wherein the coil spring biases the throttle valve toward a default position, wherein:
  the coil spring includes a first spring part having a first end, a second spring part having a second end, and an intermediate hook connecting the first spring part to the second spring part;
  the first end of the first spring part is held by a first spring locking part on the rotation member;
  the second end of the second spring part is held by a second spring locking part on the throttle body;
  the intermediate hook is configured to engage with a first stopper on the rotation member and a second stopper on the throttle body;
  one of the rotation member and the throttle shaft includes an inner circumferential support part configured to engage and support a radially inner circumferential surface of the first spring part and a radially inner circumferential surface of the second spring part;
  the rotation member includes an outer circumferential support part configured to engage and support a radially outer circumferential surface of the first spring part;
  the intermediate hook includes a first part on the first spring part side and a second part on the second spring part side; and
  when the intermediate hook is engaged with the first stopper or the second stopper, the first part of the intermediate hook abuts the first stopper or the second stopper;
wherein the second part is spaced away from the first stopper or the second stopper when the intermediate hook is engaged with the first stopper or the second stopper.

6. A throttle device, comprising:
a throttle body including an intake passage therein;
a throttle valve configured to open and close the intake passage;
a throttle shaft coupled to the throttle valve,
a rotation member coupled to the throttle shaft and configured to be rotated by a driving power source; and
a coil spring positioned between the throttle body and the rotation member, wherein the coil spring biases the throttle valve toward a default position, wherein:
  the coil spring includes a first spring part having a first end, a second spring part having a second end, and an intermediate hook connecting the first spring part to the second spring part;
  the first end of the first spring part is held by a first spring locking part on the rotation member;
  the second end of the second spring part is held by a second spring locking part on the throttle body;
  the intermediate hook is configured to engage with a first stopper on the rotation member and a second stopper on the throttle body;
  one of the rotation member and the throttle shaft includes an inner circumferential support part configured to engage and support a radially inner circumferential surface of the first spring part and a radially inner circumferential surface of the second spring part;
  the rotation member includes an outer circumferential support part configured to engage and support a radially outer circumferential surface of the first spring part;
  the intermediate hook includes a first part on the first spring part side and a second part on the second spring part side; and
  when the intermediate hook is engaged with the first stopper or the second stopper, the first part of the intermediate hook abuts the first stopper or the second stopper;
wherein:
  at least one of the first stopper and the second stopper includes a contact surface configured to abut the intermediate hook; and
  the contact surface is inclined relative to a central axis of the rotation member.

* * * * *